United States Patent [19]

Soucy

[11] Patent Number: 5,813,299

[45] Date of Patent: Sep. 29, 1998

[54] AUTOMATIC FEED ROTARY TUBING CUTTER FOR FUEL ROD TUBING OF A NUCLEAR FUEL ASSEMBLY

[75] Inventor: Richard N. Soucy, Wilmington, N.C.

[73] Assignee: General Electric Company, Schenectady, N.Y.

[21] Appl. No.: 685,833

[22] Filed: Jul. 25, 1996

[51] Int. Cl.$^6$ .................................................. B23B 5/14
[52] U.S. Cl. .................. 82/61; 82/67; 82/64; 82/130; 72/121
[58] Field of Search .................. 82/46, 48, 53.1, 82/56, 58, 59, 61, 64, 65, 67, 70.1, 70.2, 79, 83, 98, 99.1, 100, 113, 128, 130, 131; 83/54; 72/121

[56] References Cited

U.S. PATENT DOCUMENTS

| | | | |
|---|---|---|---|
| 630,998 | 8/1899 | Smith | 82/130 X |
| 3,379,080 | 4/1968 | Massa | 82/61 |
| 3,739,666 | 6/1973 | Wright et al. | 82/59 |
| 3,848,489 | 11/1974 | Santana | 82/61 |
| 5,605,083 | 2/1997 | Lupke et al. | 82/67 |

FOREIGN PATENT DOCUMENTS 129789  7/1919  United Kingdom ...................... 82/62

*Primary Examiner*—A. L. Pitts
*Assistant Examiner*—Henry W. H. Tsai
*Attorney, Agent, or Firm*—Nixon & Vanderhye P.C.

[57] ABSTRACT

A rotary tubing cutter enables automatic tube cutting without requiring manual rotation of the cutter. The apparatus includes a motor driven gear assembly including a blade gear and a feed gear. The feed gear includes a plurality of cam slots that receive pins attached to the cutting blades of the blade gear. Rotation of the feed gear relative to the blade gear effects feeding of the cutting blades. The apparatus is particularly useful for fuel rod tubing of nuclear fuel assemblies.

12 Claims, 2 Drawing Sheets

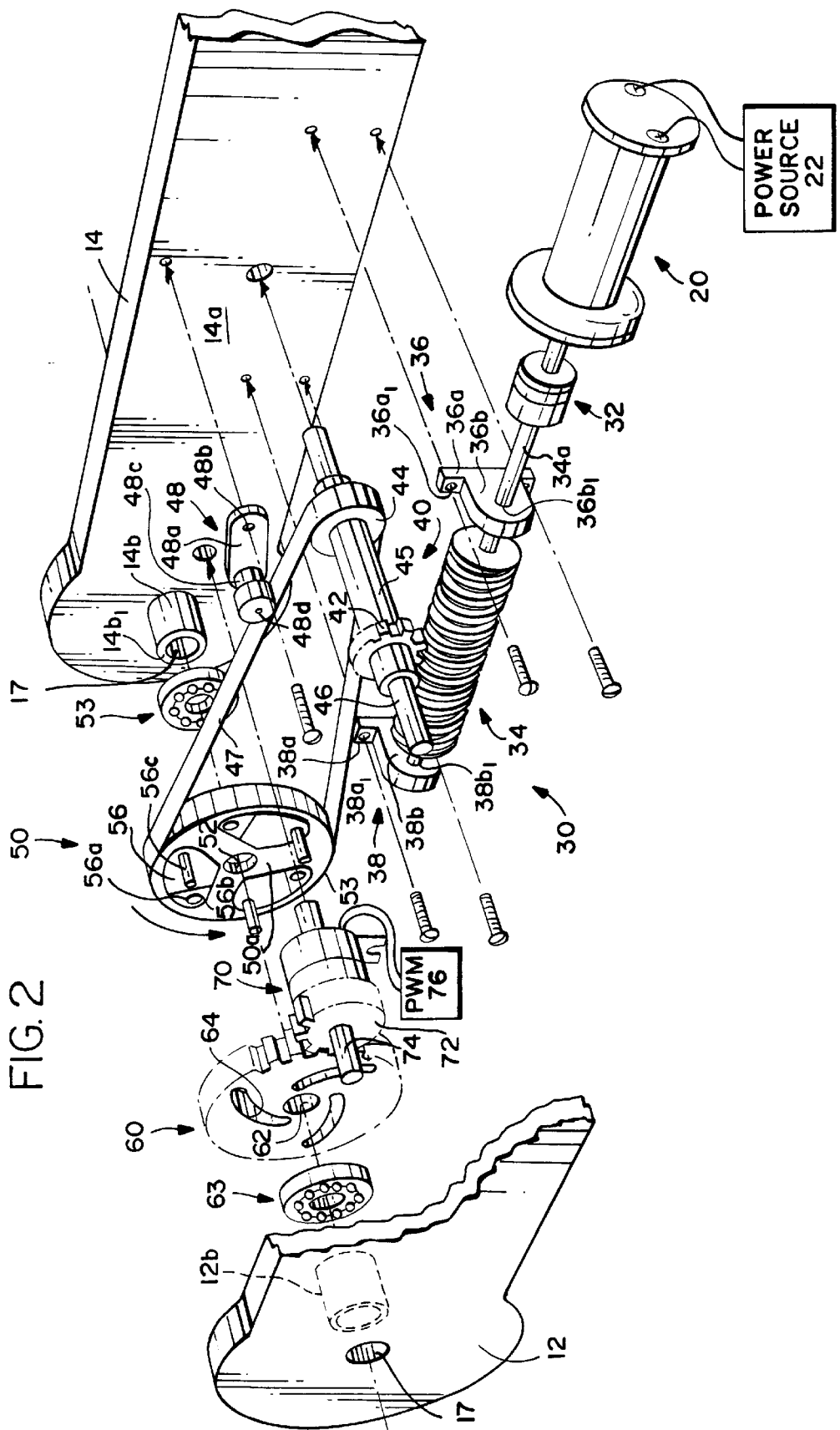

AUTOMATIC FEED ROTARY TUBING CUTTER FOR FUEL ROD TUBING OF A NUCLEAR FUEL ASSEMBLY

TECHNICAL FIELD

This invention relates generally to fuel rods of a nuclear fuel assembly for a boiling water nuclear reactor and, more particularly, to an automatic feed rotary tubing cutter that facilitates rapid cutting of fuel rod tubing.

BACKGROUND

In the production of fuel assemblies for boiling water nuclear reactors, a plurality of fuel rods are supported in a matrix configuration to form the fuel assembly. Typically, end plugs are welded to ends of the fuel rods for seating in a lower tie plate and an upper tie plate of the fuel assembly.

Automatic end plug welders, such as TIG (tungsten inert gas) welders, used in the fuel manufacturing operation (FMO) facility at times fail to properly weld the end plugs onto the tubing. This occurrence is called burn off. During a burn off situation, it is necessary to cut the partially welded and deformed end of the tubing off so that it may be removed from the machine by passing it back through the collett of the air chuck. In the present practice, a conventional tube cutter is used, such as the Imperial Eastman TC-1000, to cut an end of the fuel rod tube and remove the improperly welded end plug. At times, it is difficult for this tube cutter to be rotated due to machine component interference. Hardware must be removed prior to using the conventional cutter so that sufficient room is available to rotate the assembly.

DISCLOSURE OF THE INVENTION

It is an object of the present invention to provide a light weight hand-held device that facilitates rapid cutting of fuel rod tubing without the need to manually rotate a cutter assembly around various components. It is also an object of the invention to provide an automatic feed rotary tubing cutter that reduces operator arm and hand strain. It is yet another object of the invention to provide for variable feed rates that once set can yield consistent cuts with minimal distortion.

These and other objects of the invention are achieved by providing a rotary tubing cutter including a first rotatable gear pivotally supporting a plurality of concentric cutting blades, a second rotatable gear disposed substantially coaxially with the first gear and configured to control a cutting position of the cutting blades, and a motor coupled to the first and second gear.

The cutter may further include a clutch coupled to the second gear, which controls rotation of the second gear relative to the first gear. In this regard, the second gear may include a plurality of cam slots corresponding to the plurality of cutting blades. The cam slots are configured to urge the cutting blades simultaneously toward and away from the center of the first gear when the clutch rotates the second gear relative to the first gear. Still further, each of the cutting blades preferably includes a pin extending toward the second gear, wherein each of the pins engages a corresponding one of the cam slots in the second gear. In one arrangement, the cutting blades are biased by springs toward a disengaged position.

A pulse width modulator (PWM) may be coupled to the clutch. The PWM controls a feed rate of the cutting blades.

Finally, a housing may be provided surrounding the first gear, second gear and motor.

In accordance with another aspect of the invention, there is provided a rotary tubing cutter including a first rotatable gear pivotally supporting a plurality of concentric cutting blades, a second rotatable gear disposed substantially coaxially with the first gear and including structure for controlling a cutting position of the cutting blades, and driving structure for driving the first gear and the second gear.

Each of the cutting blades preferably includes a pin extending toward the second gear. The controlling structure includes a plurality of cam slots corresponding to the plurality of cutting blades. The cam slots receive the pins and urge the cutting blades via the pins simultaneously toward and away from a center of the first gear when the second gear is rotated relative to the first gear.

The driving structure may include a motor coupled to the first gear and the second gear. The driving structure may further include a clutch coupled to the second gear, which controls rotation of the second gear relative to the first gear.

BRIEF DESCRIPTION OF THE DRAWINGS

These and other aspects and advantages of the invention will become apparent from the following detailed description of the invention read in conjunction with the accompanying drawings, in which:

FIG. 2 is an exploded perspective view of the rotary tubing cutter according to the invention.

BEST MODE FOR CARRYING OUT THE INVENTION

Figure 1:
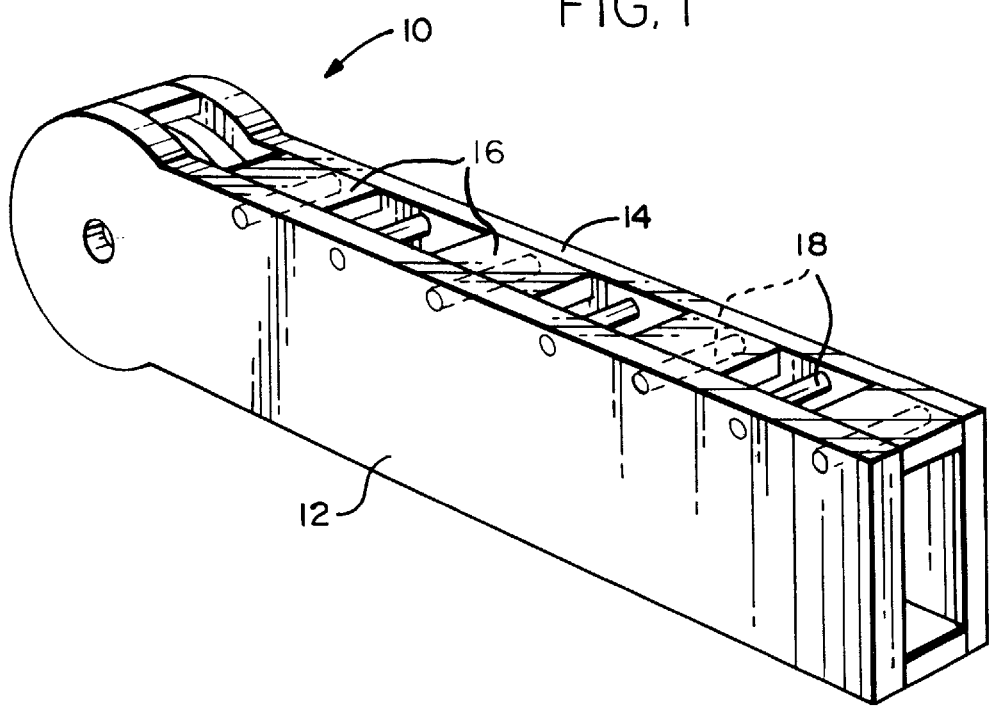
FIG. 1 is a perspective view of an assembled rotary tubing cutter according to the invention.

The internal structure (described below) of the rotary tubing cutter according to the invention is surrounded by a housing 10 as illustrated in FIG. 1. The housing 10 is separated into two components, a feed gear side component 12 and a blade gear side component 14. A plurality of spacers 16 are disposed between the side components 12, 14 circumferentially spaced about the housing perimeter. The spacers 16 maintain a working area for the internal structure. Connecting members 18, such as screws or the like, are secured between the sides 12, 14 of the housing 10. As shown in FIG. 2, the components of the rotary tubing cutter internal structure are supported between inside surfaces 12a, 14a of the side components 12, 14. The blade gear side component 14 and the feed gear side component 12 each include a connecting shaft 12b, 14b that rotatably supports the feed gear 60 and the blade gear 50, respectively.

FIG. 2 illustrates the internal structure of the rotary tubing cutter according to the present invention. The rotary tubing cutter according to the invention includes a DC motor 20 connected to a power source 22 and operatively coupled through a gear assembly 30 to a blade gear 50 and a feed gear 60. A tubing hole 17 sized to receive the tubing being cut extends through the side connecting shafts 12b, 14b, components 12, 14, the feed gear 60 and the blade gear 50.

Rotation provided by the DC motor 20 is transmitted to the gear assembly 30 by a shaft coupling 32. The gear assembly 30 includes a worm gear 34 driven by the DC motor 20 through a worm gear shaft 34a rigidly secured to the shaft coupling 32.

The worm gear shaft 34a is supported for rotation on opposite sides of the worm gear 34 by a first worm support post 36 and a second worm support post 38. The worm support posts 36, 38 are rigidly secured to the inside surface 14a of the blade gear side component 14 by screws or the like. Each worm support post 36, 38 includes a post base 36a, 38a that includes apertures $36a_1$, $38a_1$ for receiving the screws or the like that secure the worm support posts 36, 38 to the inside surface 14a. The worm support posts 36, 38 also include a shaft support member 36b, 38b including a circular opening $36b_1$, $38b_1$ at a distal end thereof for rotatably supporting the worm gear shaft 34a. A bearing (not shown) or the like may be provided in the circular opening $36b_1$, $38b_1$ to facilitate rotation of the worm gear shaft 34a.

The worm gear 34 of the gear assembly 30 is configured to drive a cluster gear 40 including a worm wheel 42 and a blade gear driving wheel 44. The worm wheel 42 and the blade gear driving wheel 44 are rigidly secured to each other such that they rotate together about a cluster gear shaft 46. The cluster gear shaft 46 is rigidly secured between the side component inside surfaces 12a, 14a.

A drive belt 47 operatively couples the blade gear driving wheel 44 to the blade gear 50. An idler wheel assembly 48 engages the drive belt 47 intermediately between the blade gear driving wheel 44 and the blade gear 50. The idler wheel assembly 48 includes an idler wheel support arm 48a biased downwardly by a torsion spring 48b, a wheel shaft 48c and an idler wheel 48d. The idler wheel assembly 48 is biased by the torsion spring 48b into engagement with the drive belt 47 and serves to take up any slack in the drive belt 47. The wheel support arm 48a is pivotally secured to the inside surface 14a of blade gear side component 14.

Figure 3:
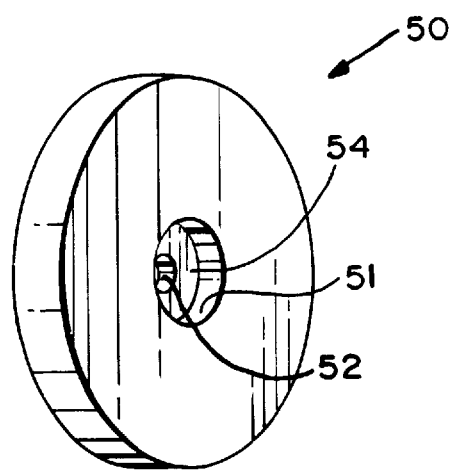
FIG. 3 is a perspective view of the blade gear of the rotary tubing cutter.

The blade gear 50 includes a connecting shaft bore 51 equal to the external diameter of a bearing 53 and of a depth equal to the bearing 53 width delimited by a shoulder 54 having therein a central opening 52 (see FIG. 3). The central opening 52 is just slightly larger in diameter than the inside diameter of the bearing 53. The connecting shaft 14b secured to the blade gear side component 14 has an outer diameter that is substantially the same size as the inner diameter of the bearing 53 for a length equal to the width of the blade gear 50. In operation, the blade gear 50 is mounted for rotation on the connecting shaft 14b such that the connecting shaft 14b is inserted into the blade gear bearing 53 until the connecting shaft shoulder 14b contacts the inner race shoulder of the bearing 53. In a preferred arrangement, the length of the connecting shaft 14b is such that when assembled the connecting shaft 14b does not protrude through the blade gear 50. For example, if the blade gear 50 is about ¼" wide, the shoulder 54 would be disposed such that the bearing 53 can be inserted so as to be flush with the gear face. Then when the gear and bearing are installed on shaft 14b the shaft does not protrude through the blade gear 50 and into the path of cutters 56.

Three cutting blades 56 are pivotally secured to the innermost surface 50a of the blade gear 50 by pivot pins 56a. The cutting blades 56 are evenly distributed about the circumference of the blade gear 50 and are preferably urged radially outwardly by a torsion spring 56b disposed surrounding each of the pivot pins 56a. In addition, each cutting blade 56 includes a cam pin 56c extending toward the feed gear side component 12 substantially perpendicular to the innermost surface 55 of the blade gear 50.

The feed gear 60 is disposed substantially coaxially with the blade gear 50 and is rotatably supported by a connecting shaft 12b of the feed gear side component 12. The feed gear 60 includes a bearing 63, mounted in the same manner as the bearing 53, in a central opening 62 substantially coaxial with the blade gear central opening 52, and three cam slots 64 corresponding to each of the three cutting blades 56 of the blade gear 50. If the blade gear 50 included more or fewer cutting blades 56, the feed gear 60 would include a corresponding more or fewer cam slots 64. Of course, the invention is not meant to be limited to three cutting blades and three cam slots.

In operation, each cam slot 64 receives a corresponding cam pin 56c of the cutting blades 56. Because the cutting blades 56 are biased radially outwardly by the torsion springs 56b, when the cam pins 56c are engaged in the cam slots 64, the cam pins 56c translate drive power from the blade gear 50 to the feed gear 60 such that the blade gear 50 and feed gear 60 rotate together.

A clutch unit 70 controls relative rotation of the feed gear 60 and the blade gear 50. The clutch unit includes a clutch gear 72 rotatably supported on a clutch post 74, which is secured between the side components 12, 14. The clutch gear 72 is in meshing engagement with the feed gear 60. When activated, the clutch unit selectively controls rotation of the feed gear 60 with a pulse width modulator (PWM) 76, which locks and unlocks the clutch gear 72. When locked, the clutch gear 72 slows or stops rotation of the feed gear 60, causing relative rotation of the feed gear 60 and the blade gear 50. As the blade gear 50 rotates relative to the feed gear 60, the cam pins 56c are driven radially inwardly or outwardly by virtue of the cam slots 64. The blade feed rate is a function of apparatus parameters such as pulse width control and the cam slot profile and is controlled by the PWM circuit 76, which is provided with a control unit (not shown) that enables direct operator input of a desired feed rate in accordance with the apparatus parameters. The clutch unit 70 is preferably a conventional electromagnetic clutch such as the SL-08 clutch available from the Dodge Division of Reliance Electric Industrial Company in Greenville, S.C.

The DC motor 20 may be monitored to effect automatic release of the cutting blades 56 after the tubing cut is complete. In this regard, a monitor can detect a current draw on the motor such that when the current draw is suddenly reduced by virtue of the lack of force on the cutting blades, the monitor would automatically shut down rotation of the DC motor 20 and clutch unit 70. When the DC motor 20 and clutch are shut down, the cam pins 56c are urged to an outermost position in the cam slot 64 by the torsion springs 56b.

By virtue of the structure according to the invention, a simplified light weight hand held apparatus can be used to cut tubing at a user selected feed rate. With respect to fuel rod tubing for nuclear fuel assemblies, the apparatus according to the invention is particularly useful for the removal of deformed ends. In addition, the apparatus may be useable for the rework of the fuel rods in the final weld area. This would increase the life of end facing cutters and decrease the cycle time on the FMO rework lathe.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotary tubing cutter, comprising:
   a first rotatable gear pivotally supporting a plurality of concentric cutting blades;
   a plurality of cam pins, one each being attached to said plurality of cutting blades, respectively;

a second rotatable gear disposed substantially coaxially with said first gear, said second gear having cam slots therein and being configured to control a cutting position of said cutting blades, wherein said cam pins engage said cam slots, respectively; and a motor coupled to said first gear and said second gear.

2. A rotary tubing cutter as claimed in claim 1, further comprising a clutch coupled to said second gear, said clutch controlling rotation of said second gear relative to said first gear.

3. A rotary tubing cutter as claimed in claim 2, wherein said second gear comprises a plurality of said cam slots corresponding to said plurality of cutting blades, said cam slots being configured to urge said cutting blades simultaneously toward and away from a center of said first gear when said clutch rotates said second gear relative to said first gear.

4. A rotary tubing cutter as claimed in claim 3, wherein said cutting blades are biased by springs toward a disengaged position.

5. A rotary tubing cutter as claimed in claim 2, further comprising a pulse width modulator coupled to said clutch, said pulse width modulator controlling a feed rate of said cutting blades.

6. A rotary tubing cutter as claimed in claim 1, further comprising a housing surrounding said first gear, said second gear, and said motor.

7. A rotary tubing cutter as claimed in claim 1, wherein said second gear comprises a plurality of said cam slots corresponding to said plurality of cutting blades, said cam slots being configured to urge said cutting blades simultaneously toward and away from a center of said first gear when said second gear is rotated relative to said first gear.

8. A rotary tubing cutter, comprising:

a first rotatable gear pivotally supporting a plurality of concentric cutting blades;

a plurality of cam pins, one each being attached to said plurality of cutting blades, respectively;

a second rotatable gear disposed substantially coaxially with said first gear, said second gear including means for controlling a cutting position of said cutting blades, wherein said controlling means comprises a plurality of cam slots corresponding to said plurality of cutting blades, said cam slots receiving said pins and urging said cutting blades via said pins simultaneously toward and away from a center of said first gear when said second gear is rotated relative to said first gear; and driving means for driving said first gear and said second gear.

9. A rotary tubing cutter as claimed in claim 8, wherein said driving means comprises a motor coupled to said first gear and said second gear.

10. A rotary tubing cutter as claimed in claim 9, wherein said driving means further comprises a clutch coupled to said second gear, said clutch controlling rotation of said second gear relative to said first gear.

11. A rotary tubing cutter as claimed in claim 10, further comprising a pulse width modulator coupled to said clutch, said pulse width modulator controlling a feed rate of said cutting blades.

12. A rotary tubing cutter as claimed in claim 8, further comprising a housing surrounding said first gear, said second gear, and said driving means.

\* \* \* \* \*